(12) United States Patent
Ueda

(10) Patent No.: US 12,019,951 B2
(45) Date of Patent: Jun. 25, 2024

(54) ABNORMAL SOUND SPECIFYING DEVICE, METHOD OF SPECIFYING ABNORMAL SOUND, AND NONTRANSITORY COMPUTER-READABLE STORAGE MEDIUM STORING COMPUTER-READABLE INSTRUCTIONS FOR ARITHMETIC DEVICE

(71) Applicant: TOYOTA JIDOSHA KABUSHIKI KAISHA, Toyota (JP)

(72) Inventor: Yu Ueda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 17/894,736

(22) Filed: Aug. 24, 2022

(65) Prior Publication Data
US 2023/0067447 A1     Mar. 2, 2023

(30) Foreign Application Priority Data

Aug. 30, 2021 (JP) ................................. 2021-139768

(51) Int. Cl.
*H04R 29/00* (2006.01)
*G06F 3/16* (2006.01)
*H04R 3/00* (2006.01)

(52) U.S. Cl.
CPC .............. *G06F 3/165* (2013.01); *H04R 3/00* (2013.01); *H04R 2499/13* (2013.01)

(58) Field of Classification Search
CPC ........ G06F 3/165; H04R 3/00; H04R 2499/13

USPC ....................................................... 381/56, 58
See application file for complete search history.

(56) References Cited

U.S. PATENT DOCUMENTS

2024/0046953 A1*   2/2024   Fujii ...................... G06N 20/00

FOREIGN PATENT DOCUMENTS

| JP | 2010-243338 A | 10/2010 |
| JP | 2017-110919 A | 6/2017 |
| JP | 2018-048886 A | 3/2018 |

* cited by examiner

*Primary Examiner* — Ammar T Hamid
(74) *Attorney, Agent, or Firm* — Dinsmore & Shohl LLP

(57) ABSTRACT

An abnormal sound specifying device may include an arithmetic device configured to access a learned model of artificial intelligence and an output device. The arithmetic device may perform: specifying frequency-time data of sound recorded at a vehicle; causing the learned model to specify a type of abnormal sound included in the sound based on the frequency-time data and causing the learnt model to specify a basis range from the frequency-time data, the basis range indicating a frequency range and a time range that are used to specify the type of the abnormal sound; designating a designated range indicating frequency and time ranges; and determining whether to cause the output device to output the type of the abnormal sound in a determination process, the determination process including, as a determination element, at least a determination on whether the basis range and the designated range overlap each other.

10 Claims, 15 Drawing Sheets

ABNORMAL SOUND SPECIFYING DEVICE, METHOD OF SPECIFYING ABNORMAL SOUND, AND NONTRANSITORY COMPUTER-READABLE STORAGE MEDIUM STORING COMPUTER-READABLE INSTRUCTIONS FOR ARITHMETIC DEVICE

CROSS-REFERENCE TO RELATED APPLICATION

This application claims priority to Japanese Patent Application No. 2021-139768 filed on Aug. 30, 2021, the contents of which are hereby incorporated by reference into the present application.

TECHNICAL FIELD

The teachings disclosed herein relate to an abnormal sound specifying device, a method of specifying abnormal sound, and a non-transitory computer-readable storage medium storing computer-readable instructions for an arithmetic device.

BACKGROUND

Japanese Patent Application Publication No. 2017-110919 describes a technique for specifying abnormal sound from sounds recorded by an image forming device. In this technique, the sound recorded by the image forming device is converted to frequency-time data that indicates a chronological change in frequency spectrum. Further, the frequency-time data is subjected to fast Fourier transform with respect to the time axis. A user specifies the type of abnormal sound (e.g., the source of abnormal sound) based on an analysis result of the fast Fourier transform and database of abnormal sounds occurred in the past.

SUMMARY

As described, according to Japanese Patent Application Publication No. 2017-110919, a user (i.e., a human) specifies the type of abnormal sound. Contrary to this, the inventors of the present application experiments to cause artificial intelligence to specify abnormal sound from sounds recorded at a vehicle. In the experiments, it was found that abnormal sound that did not occur in reality could be specified by the artificial intelligence. The disclosure herein provides techniques for accurately specifying abnormal sound using artificial intelligence.

An abnormal sound specifying device disclosed herein may comprise an arithmetic device configured to access a learned model of artificial intelligence, and an output device. The arithmetic device may be configured to perform: specifying frequency-time data that indicates a chronological change in frequency spectrum of sound recorded at a vehicle; inputting the specified frequency-time data into the learned model to cause the learned model to specify a type of abnormal sound included in the sound based on the inputted frequency-time data and to cause the learnt model to specify a basis range from the inputted frequency-time data, the basis range indicating a frequency range and a time range that were used to specify the type of the abnormal sound; designating a designated range indicating a frequency range and a time range from the specified frequency-time data; and determining whether to cause the output device to output the type of the abnormal sound in a determination process, the determination process including, as a determination element, at least a determination on whether the basis range and the designated range overlap each other.

It should be noted that "specifying frequency-time data that indicates a chronological change in frequency spectrum of sound recorded at a vehicle" as above may be the arithmetic device computing the frequency-time data based on the sound recorded at the vehicle, or the frequency-time data computed at an external device being inputted to the arithmetic device.

Further, the "leaned model" as above may exist anywhere so long as it is accessible by the arithmetic device. For example, the leaned model may be stored in a storage device within the abnormal sound specifying device, or may be stored in a storage device on a network that is accessible by the arithmetic device.

Further, the designation of a designated range may be performed according to input from a user, or the arithmetic device may autonomously perform the designation according to a predetermined algorithm.

In the abnormal sound specifying device, the arithmetic device specifies frequency-time data and inputs the specified frequency-time data into the learned model. The leaned model then specifies the type of abnormal sound included in the sound based on the frequency-time data. At this stage, the accuracy for the type of abnormal sound specified by the leaned model is not so high. That is, the leaned model could specify the type of abnormal sound that did not occur in reality. The leaned model then specifies, from the inputted frequency-time data, a basis range indicating a frequency range and a time range that were used to specify the type of the abnormal sound. Further, after specifying the frequency-time data, the arithmetic device designates a designated range indicating a frequency range and a time range from the specified frequency-time data. This designation of a designated range is performed according to an operation from the user, a predetermined algorithm, and/or the like. As the designated range, a frequency range and a time range corresponding to the abnormal sound can be designated. As above, the designated range is designated separately from the basis range specified by the leaned model. After the basis range and the designated range have been fixed, the arithmetic device determines whether to cause the output device to output the type of the abnormal sound specified by the leaned model in the determination process that includes, as its determination element, at least a determination on whether the basis range and the designated range overlap each other. When the basis range and the designated range overlap each other, it is highly probable that the type of abnormal sound specified by the leaned model is correct, whereas when the basis range and the designated range do not overlap each other, it is highly probable that the type of abnormal sound specified by the leaned model is wrong. Thus, it is possible to prevent the output device from outputting the wrong type of abnormal sound by determining whether to cause the output device to output the type of the abnormal sound specified by the leaned model in the determination process that includes, as its determination element, at least the determination on whether the basis range and the designated range overlap each other. This abnormal sound specifying device can specify the type of abnormal sound included in the sound recorded at a vehicle with higher accuracy.

DETAILED DESCRIPTION

Figure 1:
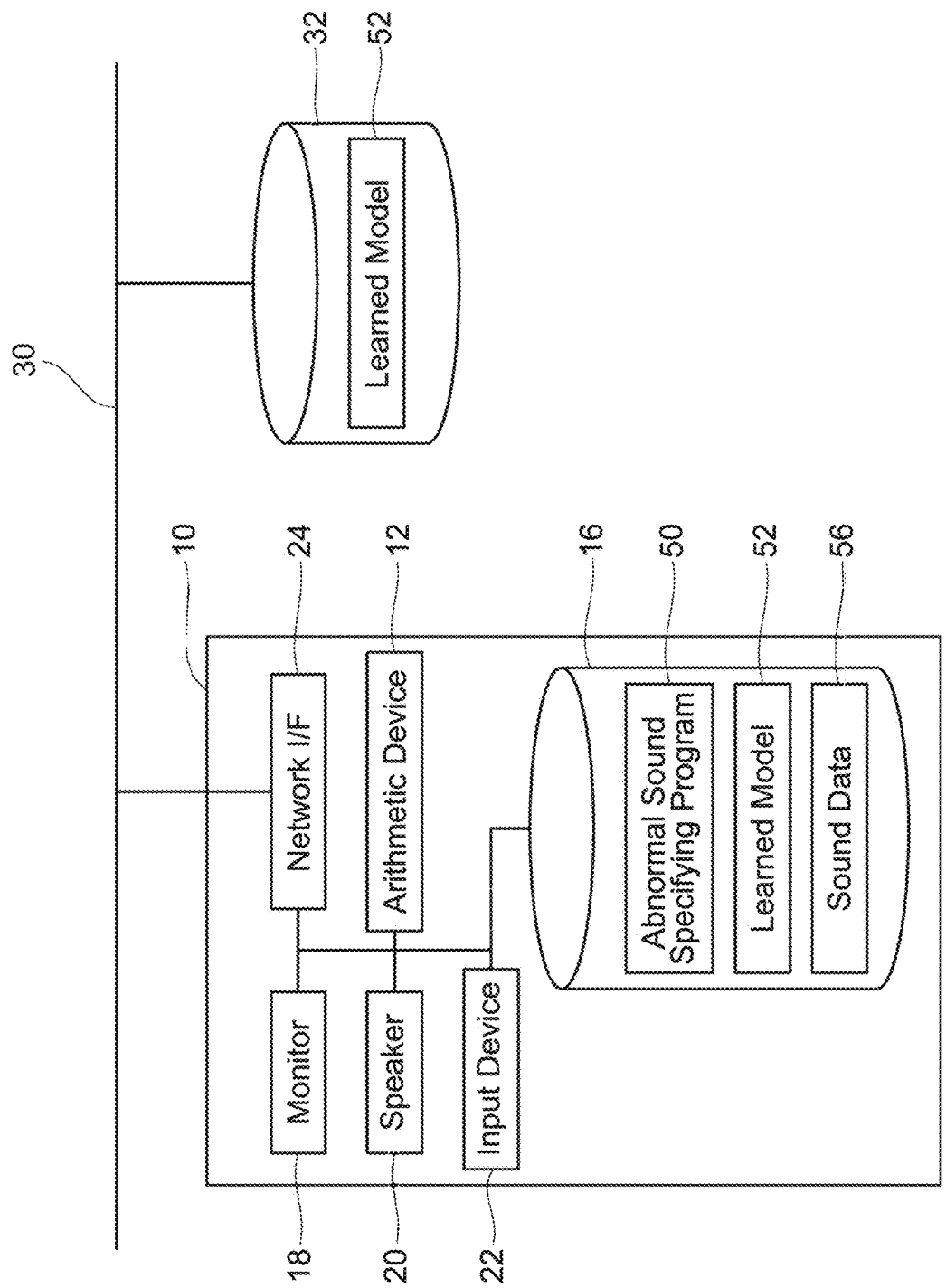
FIG. 1 is a block diagram of an abnormal sound specifying device 10.

In an example of the abnormal sound specifying device disclosed herein, the arithmetic device may be configured to cause the output device to output the type of the abnormal sound in a case where the basis range and the designated range overlap each other.

In an example of the abnormal sound specifying device disclosed herein, the arithmetic device may be configured to cause the output device not to output the type of the abnormal sound in a case where the basis range and the designated range do not overlap each other.

In an example of the abnormal sound specifying device disclosed herein, the abnormal sound specifying device may further comprise an input device. In this case, the arithmetic device may be configured to designate the designated range according to input from a user via the input device.

According to the configuration above, a range the user determined as corresponding to the abnormal sound can be designated as a designated range. Determining whether or not the designated range the user determined as corresponding to the abnormal sound overlaps the basis range specified by the leaned model allows for accurate determination on whether the type of abnormal sound specified by the leaned model is correct or not.

In an example of the abnormal sound specifying device disclosed herein, the abnormal sound specifying device may further comprise a speaker. In this case, the arithmetic device may be configured to cause the speaker to emit a sound within the designated range after the designated range has been designated and before the determination on whether the basis range and the designated range overlap each other is made.

According to the configuration above, after the designated range has been designated, the user can listen to the sound within that designated range. Thus, the user can determine whether the designated range has been designated correctly or not, and if not, the user can designate another designated range.

In an example of the abnormal sound specifying device disclosed herein, the arithmetic device may be further configured to perform computing a contour-defined basis range which is the basis range with its contour defined. In this case, the arithmetic device may be configured to determine, in the determination process, whether the contour-defined basis range and the designated range overlap each other.

The contour of the basis range specified by the leaned model could be blurry. In this case, the arithmetic device computing the contour-defined basis range, which is the basis range with its contour defined, allows for clear determination on whether the contour-defined basis range and the designated range overlap each other.

In an example of the abnormal sound specifying device disclosed herein, the learned model may comprise a convolutional network.

In an example of the abnormal sound specifying device disclosed herein, the learned model may specify the basis range using gradient-weighted class activation mapping.

Embodiments

An abnormal sound specifying device 10 illustrated in FIG. 1 specifies abnormal sound from sounds recorded at a vehicle. The abnormal sound specifying device 10 is configured of a so-called computer. The abnormal sound specifying device 10 includes an arithmetic device 12, a storage device 16, a monitor 18, a speaker 20, an input device 22, a network interface 24, etc. The arithmetic device 12 is configured of a CPU (central processing unit), a memory, etc. The arithmetic device 12 is connected to the storage device 16, the monitor 18, the speaker 20, the input device 22, and the network interface 24. The storage device 16 is configured of a hard disk drive, a solid state drive, etc. The storage device 16 stores an abnormal sound specifying program 50. The arithmetic device 12 executes the abnormal sound specifying program 50. The input device 22 is configured of a mouse, a keyboard, etc. Signals are inputted to the arithmetic device 12 by a user operating the input device 22. The arithmetic device 12 controls the monitor 18 and the speaker 20. The arithmetic device 12 is connected to a network line 30 via the network interface 24. The network line 30 may be the Internet or an intranet. A storage device 32, etc. are connected to the network line 30. At least one of the storage device 16 and the storage device 32 stores a leaned model 52. Regardless of which one of the storage device 16 and the storage device 32 stores the leaned model 52, the arithmetic device 12 can access the leaned model 52. The leaned model 52 is artificial intelligence and comprises a convolutional neural network (CNN). The leaned model 52 has already leaned to specify abnormal sound from frequency-time data (which indicates a chronological change in frequency profile of sounds). In the present embodiment, short-time Fourier transform data (abbreviated as STFT data, hereinafter) is used as the frequency-time data. When STFT data is inputted to the leaned model 52, the leaned model 52 specifies the type of abnormal sound included in that sounds based on the STFT data. The leaned model 52 also has a function of gradient-weighted class activation mapping (Grad-CAM). To specify the type of abnormal sound based on the STFT data, the leaned model 52 specifies a frequency range and a time range that are a basis for specifying the type of abnormal sound from the STFT data by using the Grad-CAM.

Figure 2:
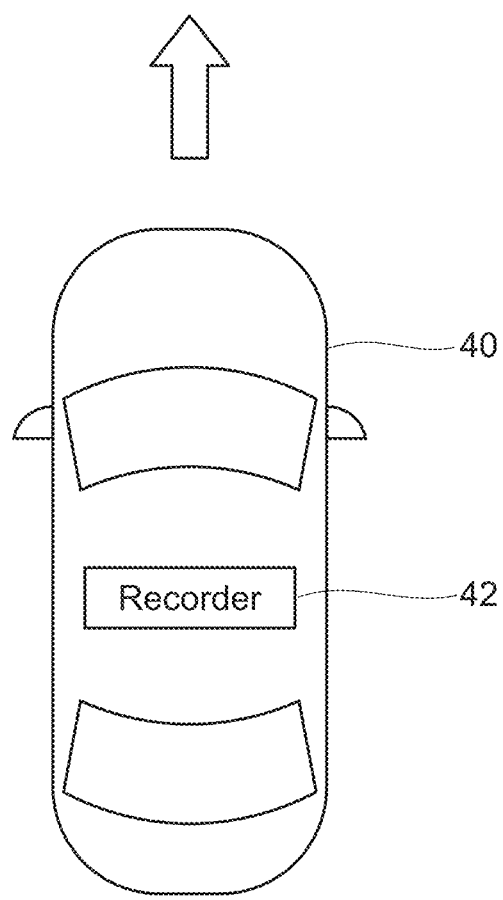
FIG. 2 is an explanatory diagram of a recorder 42.

The storage device 16 can store sound data 56. The sound data 56 is created by a recorder 42 illustrated in FIG. 2. The recorder 42 is mounted on a vehicle 40. The recorder 42 records sounds generated by the vehicle 40 while the vehicle 40 is traveling. The recorder 42 may record sounds in the occupant compartment of the vehicle or outside the occupant compartment (e.g., in the engine room). The recorder 42 stores recorded sounds as the sound data 56 in a portable storage device. The sound data 56 indicates waveforms of sound vibrations (i.e., air vibrations). The sound data 56 includes road noise of the vehicle, engine noise, operating noises of components (e.g., an alternator, a water pump, a turbocharger, a vacuum switching valve (VSV), etc.), etc. When abnormal sound occurs at the vehicle 40 for some reason, the abnormal sound is also included in the sound data 56. The sound data 56 can be inputted to the abnormal sound specifying device 10 by connecting the portable storage device to the abnormal sound specifying device 10. Alternatively, the sound data 56 can be inputted to the abnormal sound specifying device 10 via the network line 30. The sound data 56 inputted to the abnormal sound specifying device 10 is stored in the storage device 16 as illustrated in FIG. 1.

Figure 3:
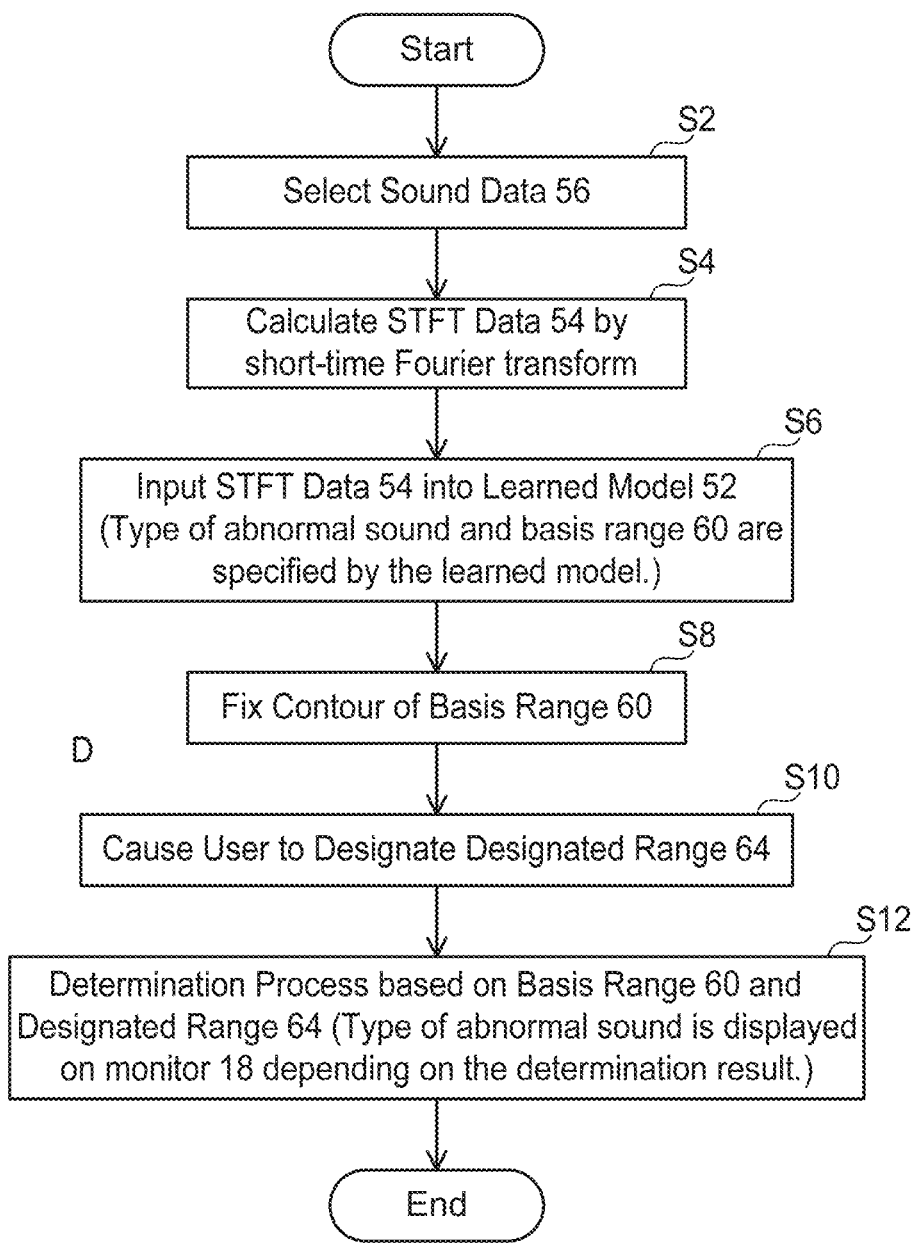
FIG. 3 is a flowchart for a method of specifying abnormal sound.

Next, a method of specifying abnormal sound performed by the abnormal sound specifying device 10 will be described. The abnormal sound specifying device 10 performs the method of specifying abnormal sound illustrated in FIG. 3 by executing the abnormal sound specifying program 50. In response to the user performing a predetermined operation via the input device 22, the arithmetic device 12 starts the abnormal sound specifying program 50 (i.e., the method of specifying abnormal sound in FIG. 3).

In step S2, the arithmetic device 12 instructs the user to select the sound data 56 by displaying a window and/or the like on the monitor 18. The user can select any sound data 56 from the sound data 56 stored in the storage device 16 via the input device 22.

Figure 4:
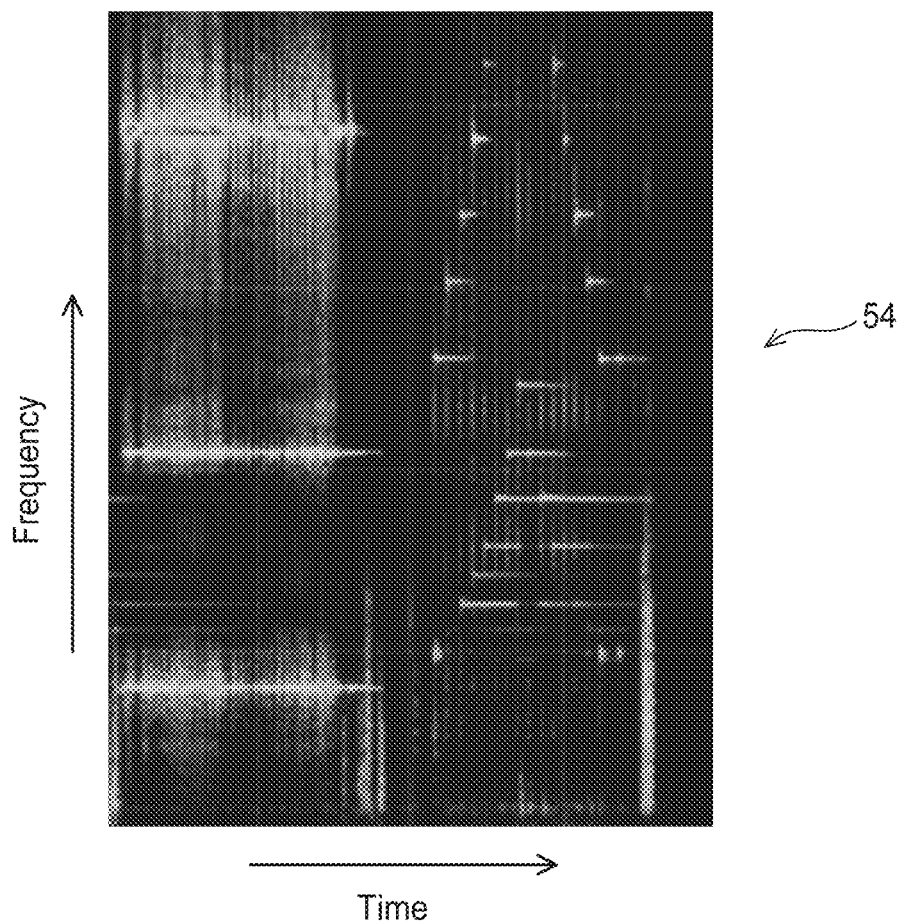
FIG. 4 is a diagram indicating STFT data 54.

In step S4, the arithmetic device 12 subjects the sound data 56 selected in step S2 to short-time Fourier transform. The arithmetic device 12 thereby computes STFT data 54 illustrated in FIG. 4. The vertical axis of the STFT data 54 represents sound frequency, and the horizontal axis of the STFT data 54 represents time. Colors of pixels in the STFT data 54 indicate sound pressure levels (dB). That is, the STFT data 54 indicates a chronological change in a frequency spectrum of sound. The arithmetic device 12 computes the STFT data 54 as image data.

Figure 5:
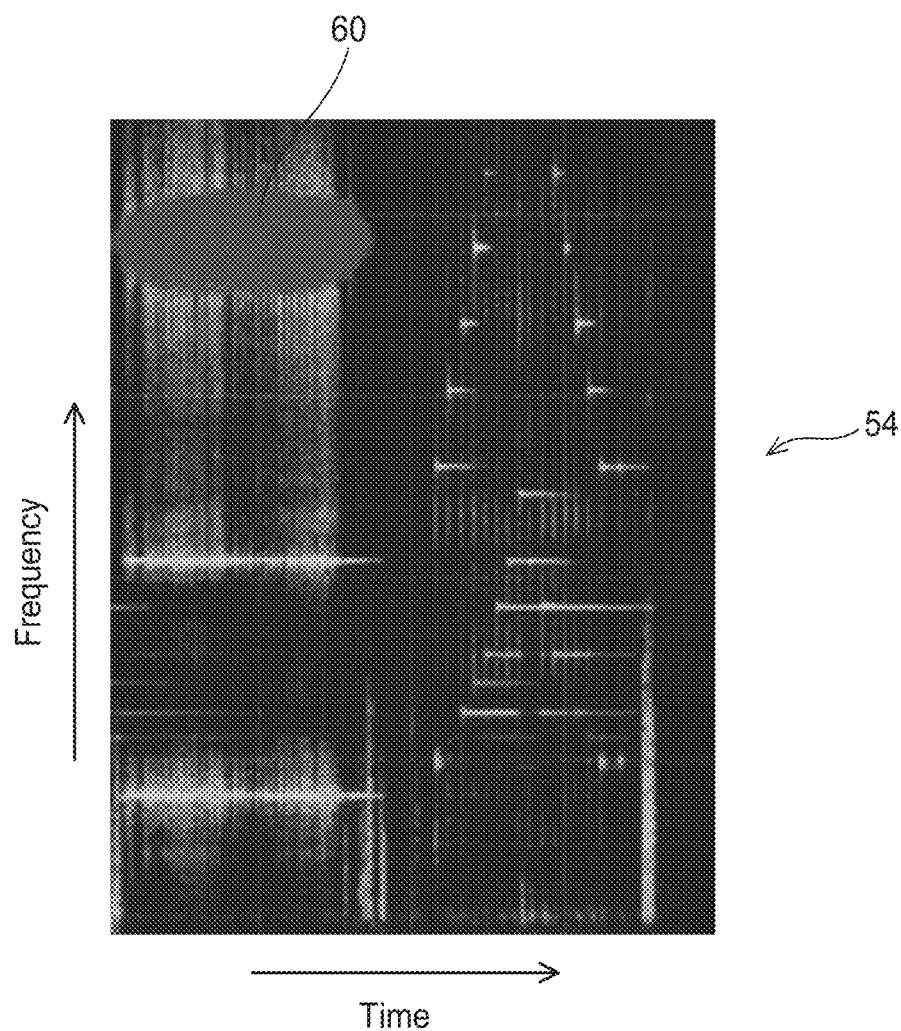
FIG. 5 is a diagram indicating a basis range 60.

In step S6, the arithmetic device 12 inputs the STFT data 54 computed in step S4 to the leaned model 52. The leaned model 52 extracts characteristic(s) from the inputted STFT data 54 and specifies abnormal sound included in the STFT data 54 (more specifically, abnormal sound included in the sound represented by the STFT data 54) based on the extracted characteristic(s). That is, the leaned model 52 specifies abnormal sound and the type of that abnormal sound at the same time. The leaned model 52 specifies abnormal sound A, abnormal sound B, or the like as a type of abnormal sound. In a more specific example, the leaned model 52 specifies alternator abnormal sound, water pump abnormal sound, turbine abnormal sound, VSV abnormal sound, etc. That is, the type of abnormal sound indicates the source of the abnormal sound. The leaned model 52 also specifies a basis range by Grad-CAM at the same time of specifying the type of abnormal sound. The basis range indicates a frequency range and a time range based on which the type of abnormal sound is specified. That is, the leaned model 52 sets a degree of importance to each pixel of the STFT data 54 and specifies the type of abnormal sound such that pixels with higher degrees of importance affect an output result (i.e., the type of abnormal sound to be specified). The basis range is a set of pixels with higher degrees of importance among the pixels in the STFT data 54. For example, a basis range 60 is specified as illustrated in FIG. 5 with respect to the STFT data 54 illustrated in FIG. 4. Since the degrees of importance of the pixels are different from each other, the contour of the basis range 60 is blurred. In step S6, the leaned model 52 may specify plural types of abnormal sound. In this case, plural basis ranges 60 are specified accordingly.

Figure 6:
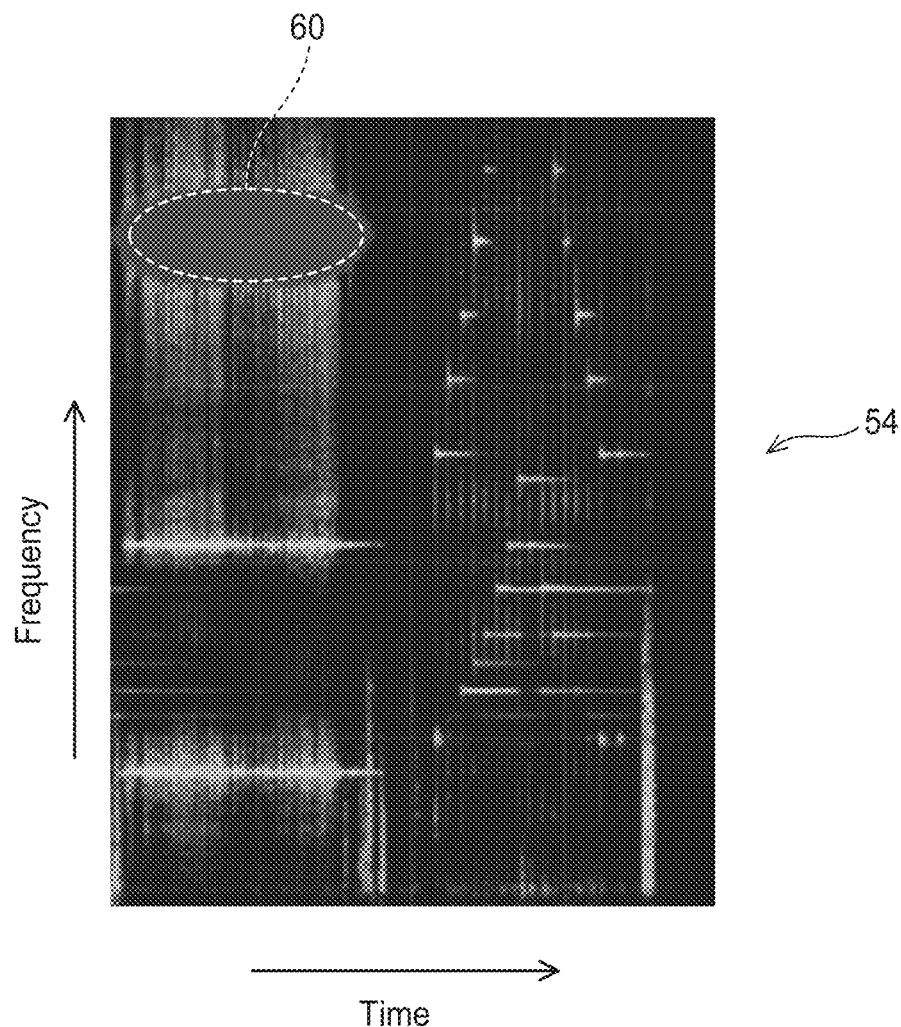
FIG. 6 is a diagram indicating the basis range 60 with its contour defined.

In step S8, the arithmetic device 12 binarizes the degrees of importance of the pixels of the STFT data 54, using a predetermined threshold. The arithmetic device 12 thereby clearly defines the contour of the basis range 60 as illustrated in FIG. 6. From step S8 and onward, the arithmetic device 12 uses this contour-defined basis range as the basis range 60.

Figure 7:
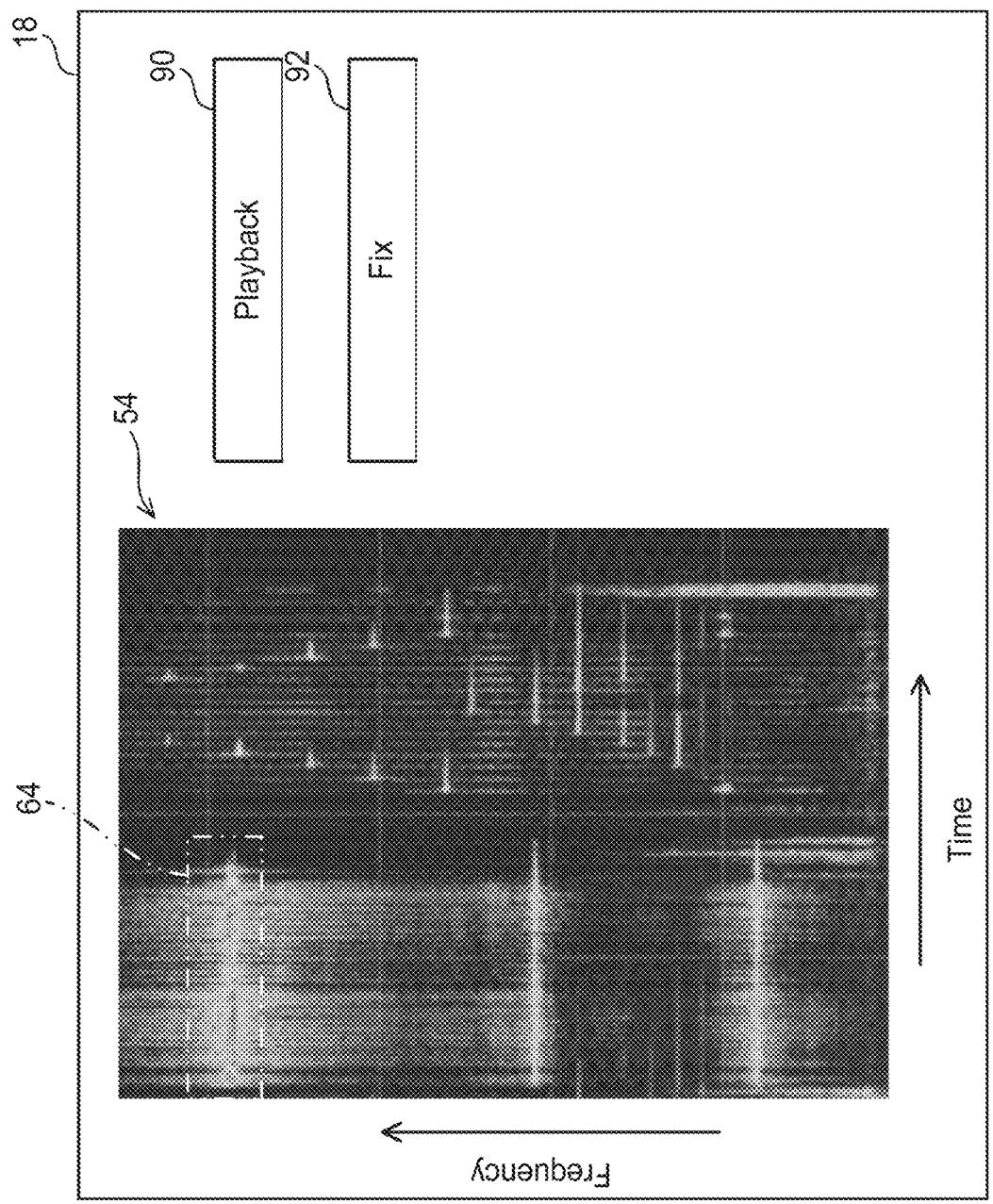
FIG. 7 is a diagram indicating a screen for selection of a designated range 64.

In step S10, the arithmetic device 12 displays the STFT data 54 on the monitor 18 as illustrated in FIG. 7. The user can select a frequency range and a time range in the STFT data 54 displayed on the monitor 18 by operating the input device 22. The ranges selected in step S10 will be termed a designated range 64 hereinafter. For example, the designated range 64 is selected as illustrated in FIG. 7. In step S10, the user can select ranges that are considered as corresponding to an abnormal sound in the STFT data 54 as the designated range 64. The user can select the designated range 64 based on his/her own experiences while seeing the STFT data 54. As illustrated in FIG. 7, a playback button 90 and a fix button 92 are displayed next to the STFT data 54. When the playback button 90 is tapped with the designated range 64 selected, the arithmetic device 12 replays a sound within the designated range 64 via the speaker 20. By listening to the sound within the designated range 64, the user can determine whether an abnormal sound is included within the designated range 64 or not. This facilitates selecting ranges considered as corresponding to an abnormal sound as the designated range 64. The user can tap the fix button 92 with the designated range 64 selected. When the fix button 92 is tapped, the arithmetic device 12 fixes the selected designated range 64 and then proceeds to the next step. As described, in step S10, ranges the user considers as corresponding to abnormal sound are designated as the designated range 64. In step S10, plural ranges may be designated as designated ranges 64.

Figure 8:
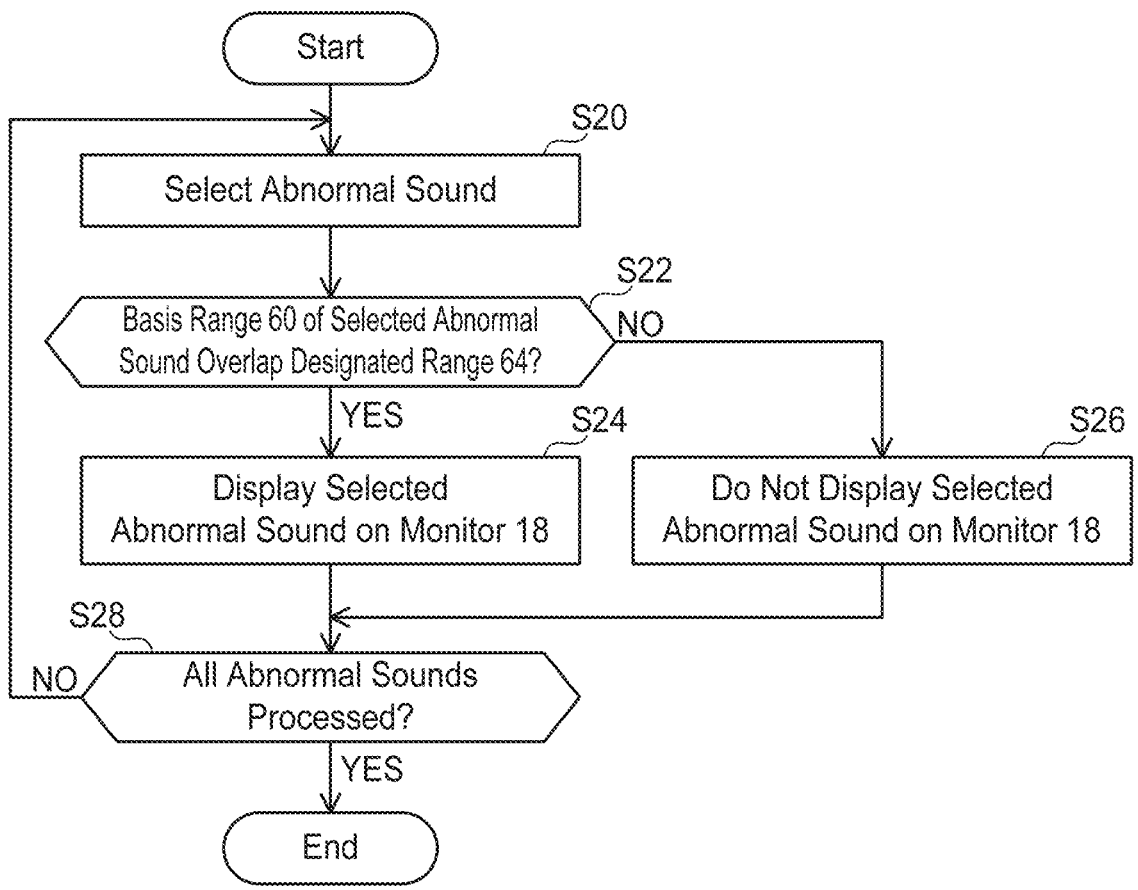
FIG. 8 is a flowchart for a determination process based on the basis range 60 and the designated range 64.

In step S12, a determination process is performed based on the basis range 60 specified in step S6 and the designated range 64 designated in step S10. Then, depending on the determination process, the type of abnormal sound is displayed on the monitor 18. FIG. 8 illustrates details of step S12. As illustrated in FIG. 8, the arithmetic device 12 performs steps S20 to S28 in step S12.

In step S20, the arithmetic device 12 selects one abnormal sound from the abnormal sounds (i.e., types of abnormal sounds) specified by the leaned model 52 in step S6. In a case where only one abnormal sound is specified in step S6, that abnormal sound is selected.

In step S22, the arithmetic device 12 determines whether the basis range 60 corresponding to the selected abnormal sound overlaps the designated range 64 or not.

Figure 9:
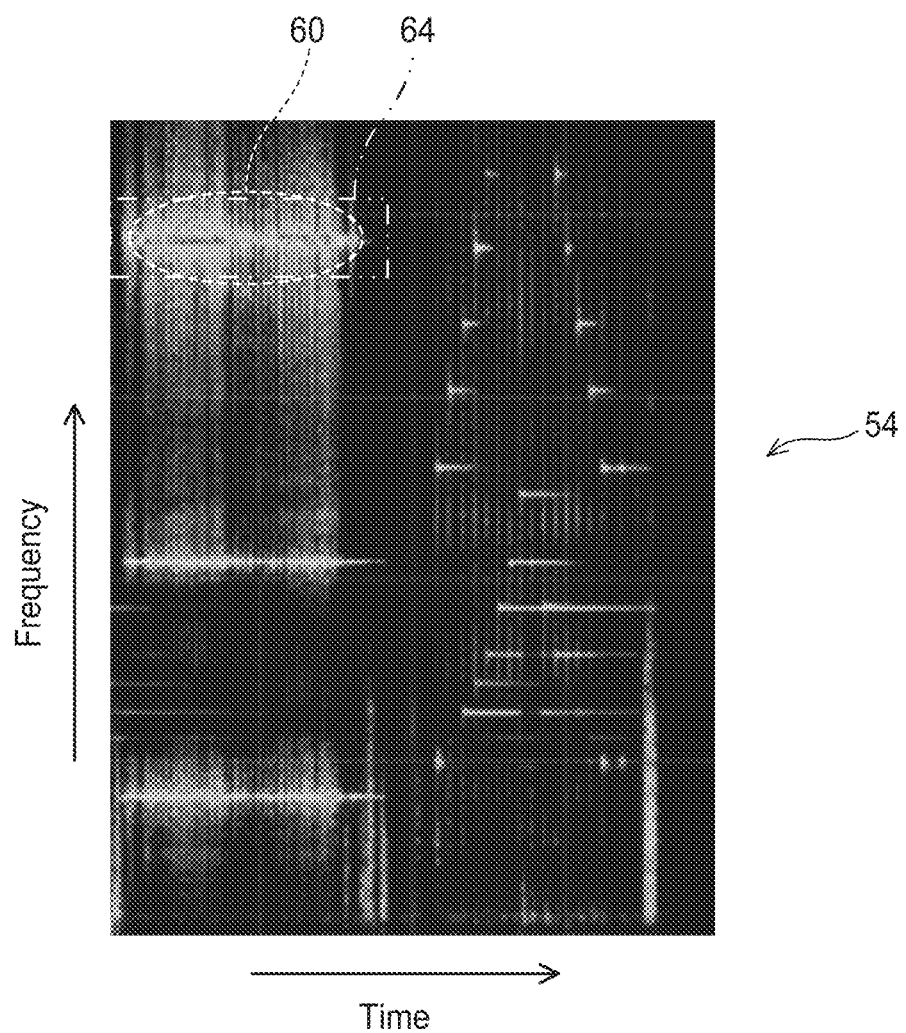
FIG. 9 is a diagram indicating a positional relationship between the basis range 60 and the designated range 64.

When the basis range 60 of the selected abnormal sound overlaps the designated range 64, for example as illustrated in FIG. 9, the arithmetic device 12 determines YES in step S22.

Figure 10:
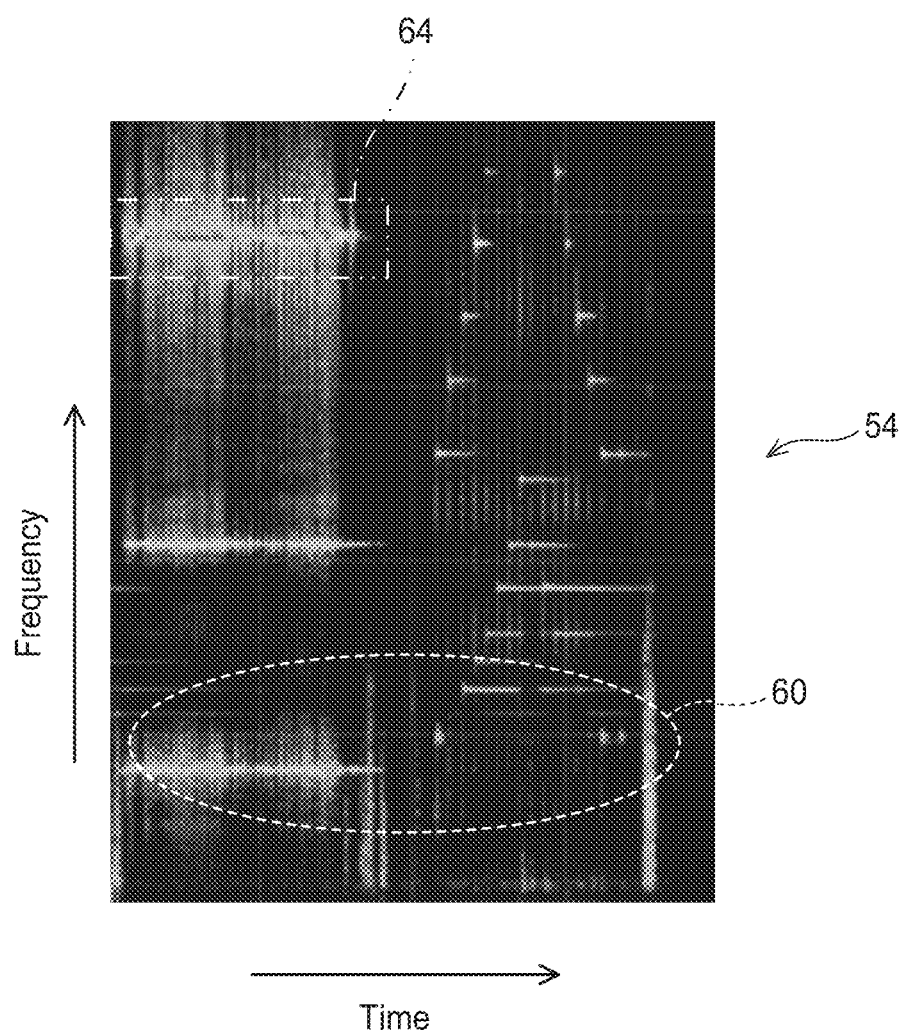
FIG. 10 is a diagram indicating a positional relationship between the basis range 60 and the designated range 64.

When the basis range 60 of the selected abnormal sound does not overlap the designated range 64, for example as illustrated in FIG. 10, the arithmetic device 12 determines NO in step S22.

Figure 11:
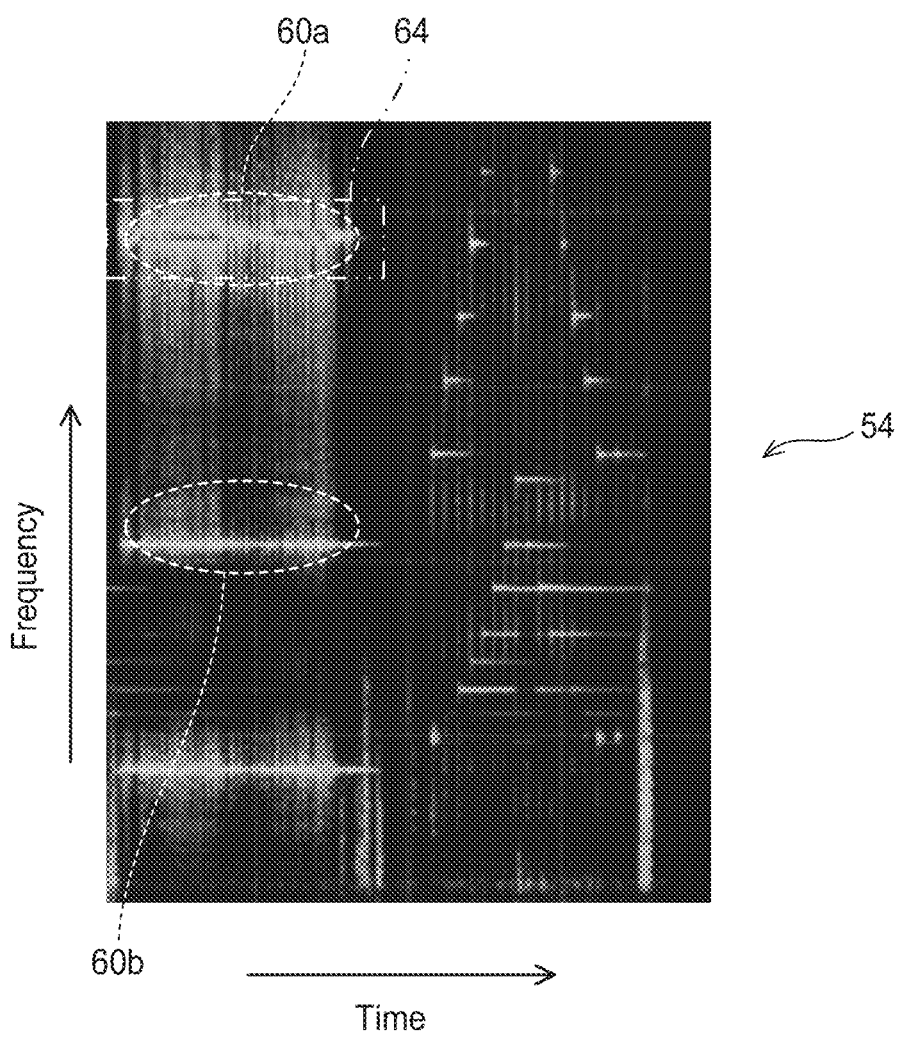
FIG. 11 is a diagram indicating a positional relationship between the basis range 60 and the designated range 64.

FIG. 11 illustrates a case in which there are plural basis ranges 60a, 60b. In this case, when the basis range 60 of the selected abnormal sound is the basis range 60a, the arithmetic device 12 determines YES in step S22 since the basis range 60a overlaps the designated range 64. When the basis range 60 of the selected abnormal sound is the basis range 60b, the arithmetic device 12 determines NO in step S22 since the basis range 60b does not overlap the designated range 64.

Figure 12:
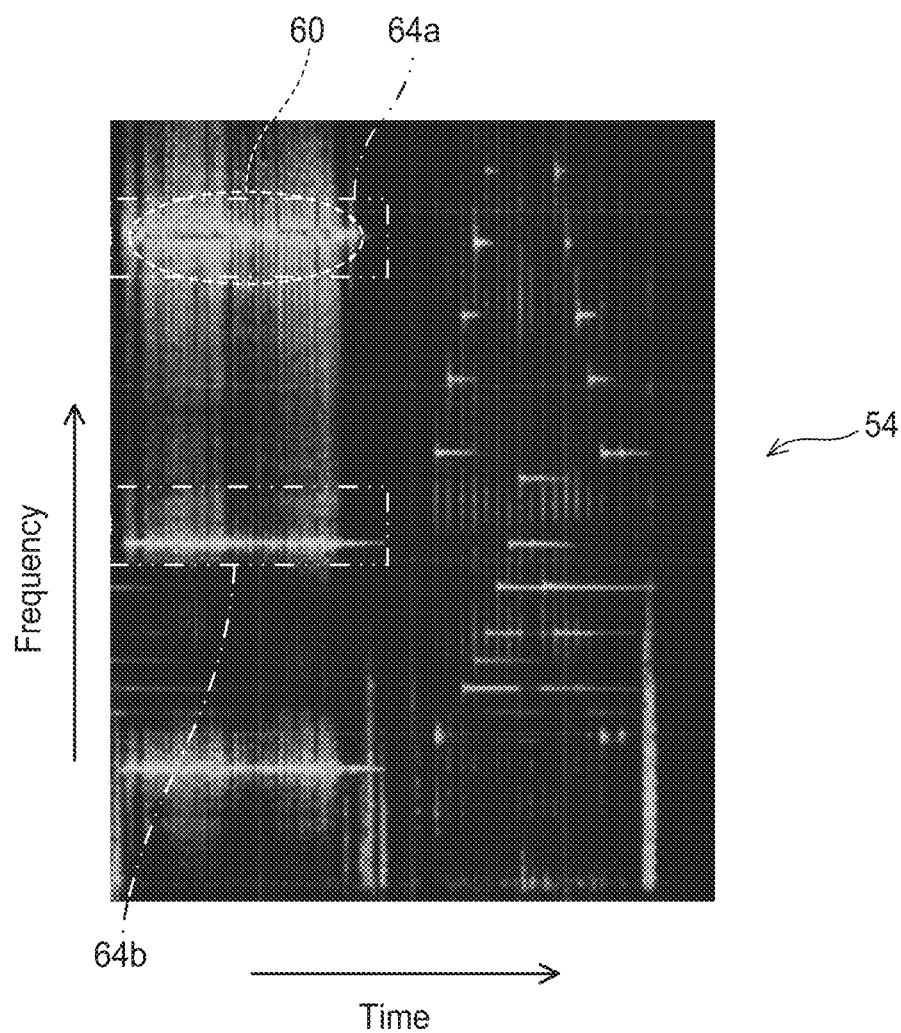
FIG. 12 is a diagram indicating a positional relationship between the basis range 60 and the designated range 64.

FIG. 12 illustrates a case in which there are plural designated ranges 64a, 64b. In this case, when the basis range 60 of the selected abnormal sound overlaps one of the designated ranges 64a, 64b, the arithmetic device 12 determines YES in step S22. When the basis range 60 of the selected abnormal sound overlaps neither of the designated ranges 64a, 64b, the arithmetic device 12 determines NO in step S22.

Figure 13:
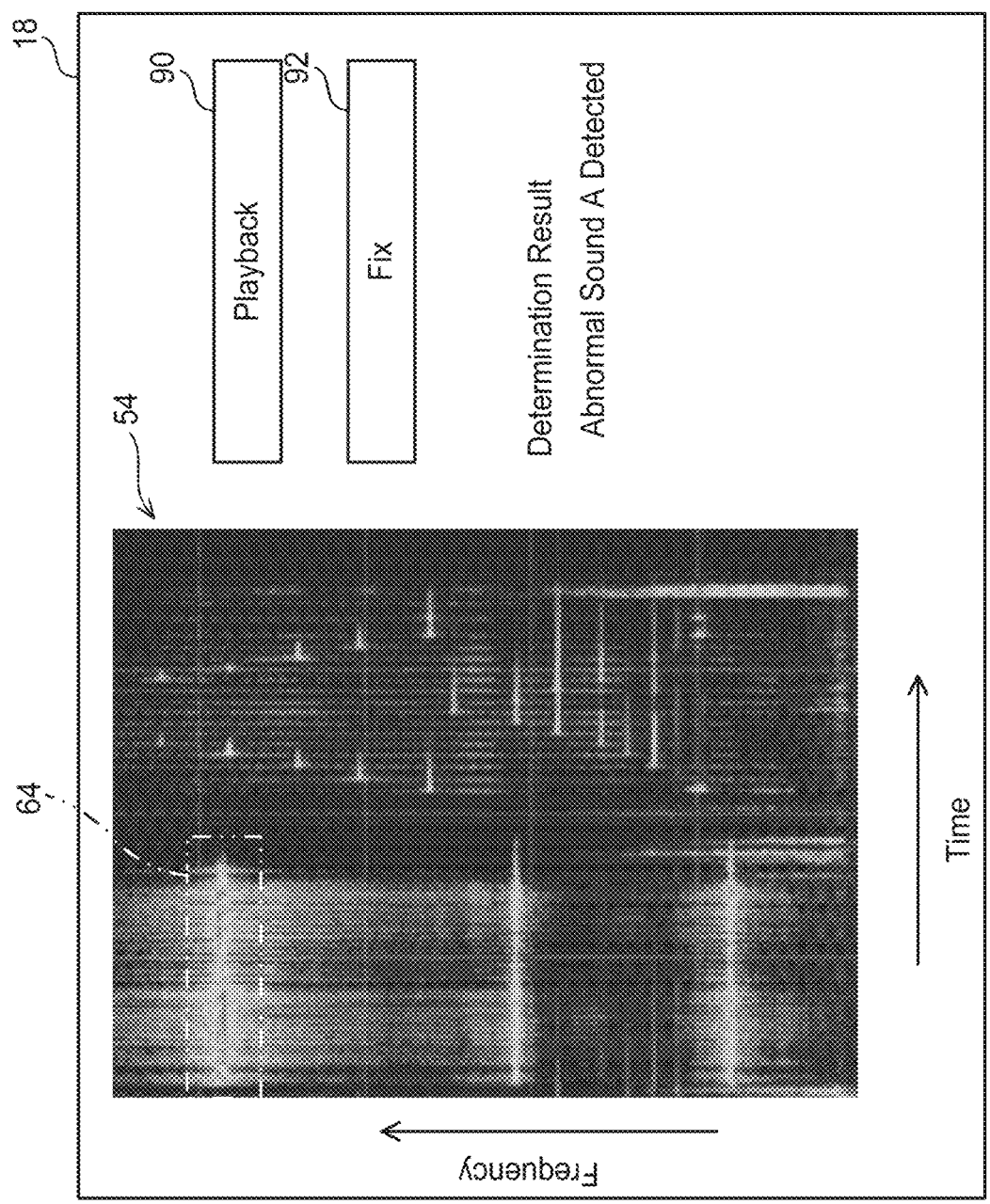
FIG. 13 is a diagram indicating a display screen for an abnormal sound specifying result.

After determining YES in step S22, the arithmetic device 12 performs step S24. In step S24, the arithmetic device 12 displays the type of abnormal sound selected in step S20 on the monitor 18. For example, in a case where the selected abnormal sound is abnormal sound A, "Abnormal Sound A Detected" is displayed on the monitor 18 in step S24 as illustrated in FIG. 13. On the other hand, after determining NO in step S22, the arithmetic device 12 performs step S26. In step S26, the arithmetic device 12 does not display the type of abnormal sound selected in step S20 on the monitor 18.

In step S28, the arithmetic device 12 determines whether the process has been performed to all abnormal sounds specified by the leaned model 52 or not. In case of NO in step S28, step S20 is performed again. In this case, another abnormal sound to which the process has not been performed yet is selected in step S20. Thus, steps S20 to S28 are repeated until the process is performed to all abnormal sounds. In a case where plural abnormal sounds are specified by the leaned model 52, only the abnormal sound(s) of which determination result in step S22 is YES is(are) displayed on the monitor 18. In a case where there are no abnormal sounds of which determination result in step S22 is YES, "No Abnormal Sounds Detected" is displayed on the monitor 18. When the process has been performed to all abnormal sounds specified by the leaned model 52, the arithmetic device 12 ends the abnormal sound determination process.

As described, the arithmetic device 12 displays the type of selected abnormal sound on the monitor 18 in the case where the basis range 60 of the selected abnormal sound and the designated range 64 designated by the user overlap each other, whereas it does not display the type of the selected abnormal sound on the monitor 18 in the case where the basis range 60 of the selected abnormal sound and the designated range 64 designated by the user do not overlap each other. Thus, abnormal sound(s) that matches the abnormal sound recognized by the user among abnormal sound(s) specified by the leaned model 52 is(are) displayed on the monitor 18, whereas abnormal sound(s) that the user does not recognize among abnormal sound(s) specified by the leaned model 52 is(are) not displayed on the monitor 18. Thus, the user can confirm the type of abnormal sound that he/she recognizes as abnormal sound on the monitor 18.

According to the abnormal sound specifying device 10 of the embodiment, the abnormal sound that the user recognizes as abnormal sound is selected from among the abnormal sound(s) specified by the learned model 52 and the type of that abnormal sound is displayed on the monitor 18. Thus, the type of abnormal sound actually occurred at the vehicle 40 can be specified accurately.

Further, the abnormal sound specifying device 10 of the embodiment can playback the sound within the designated range 64 after the user has selected the designated range 64. This helps the user specify ranges corresponding to an abnormal sound as the designated range 64.

Further, the abnormal sound specifying device of the embodiment can accurately determine whether the basis range 60 and the designated range 64 overlap each other or not since the arithmetic device 12 defines the contour of the basis range 60 specified by the leaned model 52.

Figure 14:
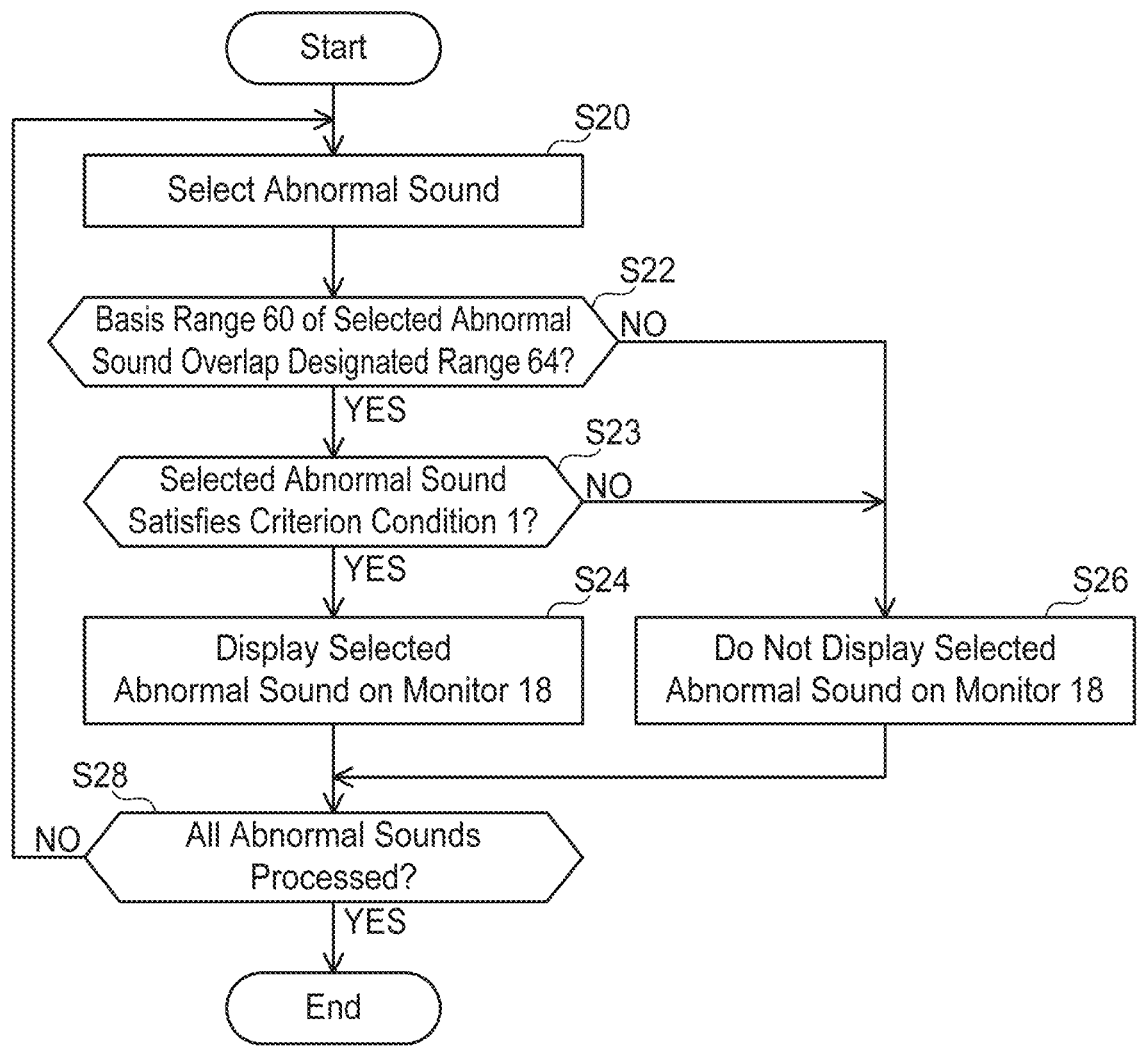
FIG. 14 is a flowchart for a determination process according to a modification.

In FIG. 8, in the case where it is determined that the basis range 60 and the designated range 64 overlap each other in step S22, the selected abnormal sound is displayed on the monitor 18 in step S24. However, as illustrated in FIG. 14, step S23 in which another determination is made may be performed between step S22 and step S24. In FIG. 14, in a case where the selected abnormal sound does not satisfy a criterion condition 1 (i.e., NO in step S23), the selected abnormal sound is not displayed on the monitor 18 even when the basis range 60 and the designated range 64 overlap each other. Thus, even when the determination of YES is made in step S22, the selected abnormal sound may not be displayed on the monitor 18.

Figure 15:
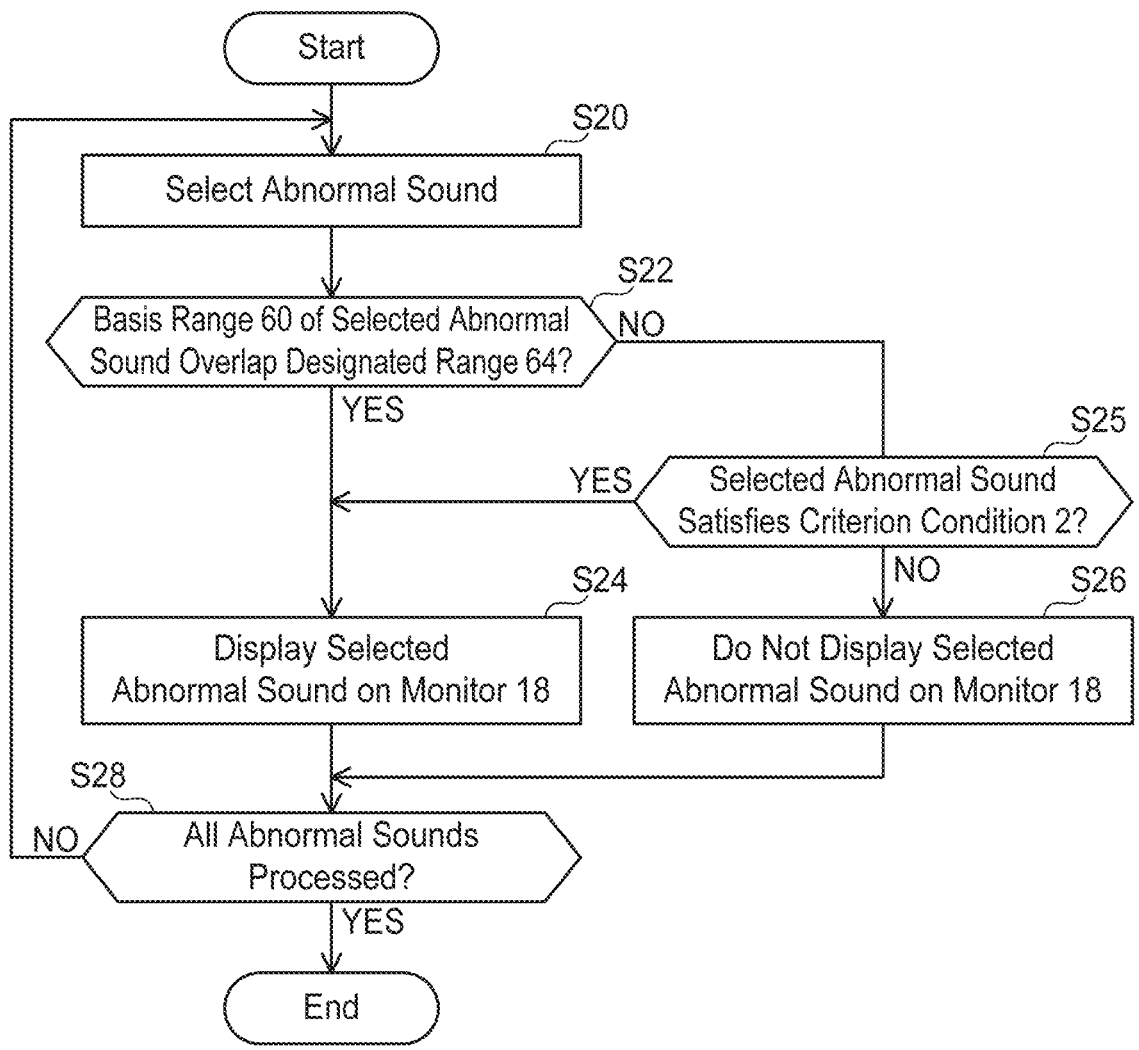
FIG. 15 is a flowchart for a determination process according to a modification.

Further, in FIG. 8, in the case where it is determined that the basis range 60 and the designated range 64 do not overlap each other in step S22, the selected abnormal sound is not displayed on the monitor 18 in step S26. However, as illustrated in FIG. 15, step S25 in which another determination is made may be performed between step S22 and step S26. In FIG. 15, in a case where the selected abnormal sound satisfies a criterion condition 2 (i.e., YES in step S25), the selected abnormal sound is displayed on the monitor 18 even when the basis range 60 and the designated range 64 do not overlap each other. Thus, even when the determination of NO is made in step S22, the selected abnormal sound may be displayed on the monitor 18. Further, FIG. 14 and FIG. 15 may be combined.

In the embodiment described above, the arithmetic device 12 causes the monitor 18 to display the type of abnormal sound. However, the arithmetic device 12 may cause another device to output the type of abnormal sound. For example, the arithmetic device 12 may cause another device to output the type of abnormal sound via the network line 30.

In the embodiment described above, the STFT data 54 is image data, that is, the leaned model 52 specifies the type of abnormal sound and a basis range based on the STFT data 54, which is image data. However, the data format of the STFT data 54 is not limited to image data. For example, the STFT data 54 may be data that indicates time and values of sound pressure levels for respective frequencies.

In the embodiment described above, the designated range 64 is designated by user's operation. However, the arithmetic device 12 may designate the designated range 64 according to a predetermined algorithm. For example, the arithmetic device 12 may automatically designate ranges with higher sound pressure levels as the designated range 64. This configuration can also specify the type of abnormal sound accurately since the type of abnormal sound to be finally outputted can be selected using the basis range 60 and the designated range 64 specified by different algorithms.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. An abnormal sound specifying device, comprising:
an arithmetic device configured to access a learned model of artificial intelligence; and
an output device,
wherein the arithmetic device is configured to perform:
specifying frequency-time data that indicates a chronological change in frequency spectrum of sound recorded at a vehicle;
inputting the specified frequency-time data into the learned model to cause the learned model to specify a type of abnormal sound included in the sound based on the inputted frequency-time data and to cause the learnt model to specify a basis range from the inputted frequency-time data, the basis range indicating a frequency range and a time range that are used to specify the type of the abnormal sound;
designating a designated range indicating a frequency range and a time range from the specified frequency-time data; and
determining whether to cause the output device to output the type of the abnormal sound in a determination process, the determination process including, as a determination element, at least a determination on whether the basis range and the designated range overlap each other.

2. The abnormal sound specifying device of claim 1, wherein the arithmetic device is configured to cause the output device to output the type of the abnormal sound in a case where the basis range and the designated range overlap each other.

3. The abnormal sound specifying device of claim 1, wherein the arithmetic device is configured to cause the output device not to output the type of the abnormal sound in a case where the basis range and the designated range do not overlap each other.

4. The abnormal sound specifying device of claim 1, further comprising an input device,
wherein the arithmetic device is configured to designate the designated range according to input from a user via the input device.

5. The abnormal sound specifying device of claim 1, further comprising a speaker,
wherein the arithmetic device is configured to cause the speaker to emit sound within the designated range after the designated range has been designated and before the determination on whether the basis range and the designated range overlap each other is made.

6. The abnormal sound specifying device of claim 1, wherein
the arithmetic device is further configured to perform computing a contour-defined basis range which is the basis range with its contour defined, and
the arithmetic device is configured to determine, in the determination process, whether the contour-defined basis range and the designated range overlap each other.

7. The abnormal sound specifying device of claim 1, wherein the learned model comprises a convolutional network.

8. The abnormal sound specifying device of claim 7, wherein the learned model specifies the basis range using gradient-weighted class activation mapping.

9. A method for specifying abnormal sound from sound recorded at a vehicle using an arithmetic device and an output device, wherein
the arithmetic device is configured to access a learned model of artificial intelligence,
the method comprises:
the arithmetic device specifying frequency-time data that indicates a chronological change in frequency spectrum of the sound;
the arithmetic device inputting the specified frequency-time data into the learned model to cause the learned model to specify a type of abnormal sound included in the sound based on the inputted frequency-time data and to cause the learned model to specify a basis range from the inputted frequency-time data, the basis range indicating a frequency range and a time range that are used to specify the type of the abnormal sound;
the arithmetic device designating a designated range indicating a frequency range and a time range from the specified frequency-time data; and
the arithmetic device determining whether to cause the output device to output the type of the abnormal sound in a determination process, the determination process including, as a determination element, at least a determination on whether the basis range and the designated range overlap each other.

10. A non-transitory computer-readable storage medium storing computer-readable instructions for an arithmetic device,
wherein the computer-readable instructions, when executed by a processor of the arithmetic device configured to access a learned model of artificial intelligence and connected to an output device, cause the arithmetic device to:
specify frequency-time data that indicates a chronological change in frequency spectrum of sound recorded at a vehicle;
input the specified frequency-time data into the learned model to cause the learned model to specify a type of an abnormal sound included in the sound based on the inputted frequency-time data and to cause the learned model to specify a basis range from the inputted frequency-time data, the basis range indicating a frequency range and a time range that were used to specify the type of the abnormal sound;
designate a designated range indicating a frequency range and a time range from the specified frequency-time data; and
determine whether to cause the output device to output the type of the abnormal sound in a determination process, the determination process including, as a determination element, at least a determination on whether the basis range and the designated range overlap each other.

* * * * *